US011671817B2

(12) United States Patent
Stroman et al.

(10) Patent No.: US 11,671,817 B2
(45) Date of Patent: Jun. 6, 2023

(54) METHOD FOR ESTIMATING THE TIME-VARYING ENERGY BALANCE OF A COLLECTION OF ENERGY SINKS, HARVESTERS, AND STORAGE DEVICES

(71) Applicant: GOVERNMENT OF THE UNITED STATES OF AMERICA, AS REPRESENTED BY THE SECRETARY OF THE NAVY, Arlington, VA (US)

(72) Inventors: Richard O. Stroman, Washington, DC (US); Karen Swider-Lyons, Alexandria, VA (US); Eric A. Leadbetter, Columbia, MD (US); Christopher Buesser, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 78 days.

(21) Appl. No.: 17/160,569

(22) Filed: Jan. 28, 2021

(65) Prior Publication Data

US 2021/0160682 A1 May 27, 2021

Related U.S. Application Data

(63) Continuation of application No. 15/895,003, filed on Feb. 13, 2018, now Pat. No. 10,936,035.

(51) Int. Cl.
*G05B 15/02* (2006.01)
*G06F 1/28* (2006.01)
(Continued)

(52) U.S. Cl.
CPC .............. *H04W 8/06* (2013.01); *G05B 15/02* (2013.01); *G06F 1/28* (2013.01); *H02J 3/00* (2013.01);
(Continued)

(58) Field of Classification Search
CPC ................. H04L 61/4588; H04L 61/50; H04L 2101/654
See application file for complete search history.

(56) References Cited

U.S. PATENT DOCUMENTS 4,274,132 A * 6/1981 Molyneux-Berry ........................ H02M 3/33569 363/21.13
8,909,950 B1 * 12/2014 Levchuk ............. H04W 52/223 455/418

(Continued)

FOREIGN PATENT DOCUMENTS

WO WO-2009117364 A2 * 9/2009 .......... B61L 27/0027
WO WO-2013108246 A2 * 7/2013 .......... B60L 11/1861

*Primary Examiner* — Jennifer L Norton
(74) *Attorney, Agent, or Firm* — US Naval Research Laboratory; Suresh Koshy

(57) ABSTRACT

An embodiment of the invention includes a non-transitory computer-readable medium storing instructions that, when executed by a computer, cause the computer to carry out a method for scheduling at least one activity to achieve a time-varying energy balance of a power system. A mission plan for a mission is received. The mission plan includes at least one activity and at least one route. Each route of the at least one route includes at least one time and at least one location. A plurality of power load identifications is received for at least one time-varying power load for use in the mission plan. A plurality of energy storage device identifications is received for at least one energy storage device. Based on the plurality of power load identifications, a power requirement required to complete the mission plan is determined using the at least one power load. Based at least in
(Continued)

part on the mission plan and the plurality of energy storage device identifications, an available power for the mission is determined. The at least one activity along the at least one route is scheduled based on the power requirement and the available energy.

4 Claims, 4 Drawing Sheets

(51) Int. Cl.
 *H02J 3/00* (2006.01)
 *H02J 3/38* (2006.01)
 *H04W 8/06* (2009.01)
 *H02J 7/35* (2006.01)
(52) U.S. Cl.
 CPC .............. *H02J 3/003* (2020.01); *H02J 3/381* (2013.01); *H02J 7/35* (2013.01); *H02J 2203/20* (2020.01); *H02J 2300/20* (2020.01); *H02J 2300/24* (2020.01); *Y02E 60/00* (2013.01); *Y04S 40/20* (2013.01)

(56) References Cited

U.S. PATENT DOCUMENTS

| | | | |
|---|---|---|---|
| 2007/0050225 A1* | 3/2007 | Leslie | G06Q 10/1097 705/7.21 |
| 2008/0183345 A1* | 7/2008 | Chandra | B61L 3/006 701/19 |
| 2013/0229051 A1* | 9/2013 | Craig | B60R 16/03 307/9.1 |
| 2014/0152090 A1* | 6/2014 | Craig | B60R 16/03 307/9.1 |
| 2014/0183947 A1* | 7/2014 | Chandler | H02J 9/061 307/64 |
| 2016/0363456 A1* | 12/2016 | Pujos | G01C 21/3697 |
| 2017/0283024 A1* | 10/2017 | Converse | B63H 21/21 |
| 2018/0196896 A1* | 7/2018 | Arai | H02S 50/00 |
| 2019/0132799 A1* | 5/2019 | Lippman | G06F 1/3212 |
| 2019/0326764 A1* | 10/2019 | Gu | H02J 7/0065 |
| 2021/0110502 A1* | 4/2021 | Vaujour | B64G 1/242 |
| 2022/0373986 A1* | 11/2022 | Kopp | H02J 3/46 |
| 2022/0383432 A1* | 12/2022 | Sakata | B60L 53/62 |
| 2023/0058022 A1* | 2/2023 | Chung | G06F 3/0625 |

\* cited by examiner

METHOD FOR ESTIMATING THE TIME-VARYING ENERGY BALANCE OF A COLLECTION OF ENERGY SINKS, HARVESTERS, AND STORAGE DEVICES

CROSS-REFERENCE TO RELATED APPLICATIONS

The present application claims priority to U.S. Provisional Patent Application Ser. No. 62/458,092, which was filed on 13 Feb. 2017 and is incorporated herein by reference, as well as U.S. patent application Ser. No. 15/985,003, which was filed on 13 Feb. 2018 and is incorporated herein by reference.

FIELD OF THE INVENTION

The field of the invention relates in general to a method and/or apparatus of estimating an energy balance of a power system based on a mission and/or of mission-scheduling based on available energy, and more particularly to a computer-implemented method and/or apparatus of estimating an energy balance of a collection of energy loads, energy harvesters, and energy storage devices based on a mission and/or of mission-scheduling based on available energy.

BACKGROUND OF THE INVENTION

Field workers include anyone who plans to carry energy-consuming and/or energy-harvesting devices for a long period of time without resupply. Examples of such field workers include aid workers, campers, hikers, mountain climbers, scientific expedition workers, dismounted soldiers, divers, astronauts, and other people operating in austere environments. The field workers often carry many electronic devices that require energy, such as radios, navigation systems, and night vision goggles. They currently have no way to assess how much energy they will need on a mission or what equipment best satisfies their energy needs. The field workers compensate for such uncertainty by packing as many energy storage devices as possible, thereby often taking far more than necessary. The energy storage devices required to support the electronic devices have grown to encompass ⅓ or more of the weight carried by a typical field worker, resulting in impaired mission performance and injuries. The unnecessary energy storage weight also exacerbates the logistics burden and environmental problems, when unnecessary energy storage devices are discarded to lighten the load.

In recent years, some employers have provided their field workers with lightweight energy harvesting devices, such as solar panels, that can displace some of the energy storage devices. They have also encouraged the development of interconnected power systems in which the loads, harvesters, and energy storage devices work together. However, assessing the amount of energy a power system requires for a mission is complicated by environmental influences and the field worker's activity. For example, batteries provide less energy in cold conditions, whereas solar panels yield less energy in cloudy or hot conditions. Some field worker activities change the rate of energy consumption or make energy harvesting devices impractical. Omitting environmental influences and field worker activities can yield inaccurate results when estimating the energy required for a mission.

In the past, performance estimates of power systems relied on nominal averages that were assumed constant over the course of a mission. For example, a 100 Wh battery was assumed to always yield 100 Wh, no matter how it was used or in what environment it was used. The results were unrealistic energy cost/benefit analyses that did not account for device-device interactions, field worker activities, and/or environmental influences. As a result, in the past, a field worker has been unable to assess timely, realistically, and quantitatively the benefit of an energy harvester to the field worker with batteries in hand for the purpose of determining the least weight combination of energy sources and/or mission activity scheduling.

BRIEF SUMMARY OF THE INVENTION

An embodiment of the invention includes a computer-readable medium storing instructions that, when executed by at least one computer, cause the at least one computer to carry out a method (herein referred to as an "energy analysis code") for estimating a time-varying energy balance of a power system. A first mission plan for a mission is received. The first mission plan includes at least one activity and at least one route. Each route of the at least one route includes at least one time and at least one location. A plurality of power load identifications is received for at least one time-varying power load for use in the first mission plan. A time-varying power requirement to complete the first mission plan is determined.

An embodiment of the invention includes a computer-readable medium storing instructions that, when executed by at least one computer, cause the at least one computer to carry out a method (herein referred to as a "mission optimizer code") for determining a baseline plurality of energy storage devices required to satisfy a time-varying power requirement. The baseline plurality of energy storage devices includes a baseline number and type of energy storage devices.

An embodiment of the invention includes a computer-readable medium storing instructions that, when executed by a computer, cause the computer to carry out a method (herein referred to as a "mission optimizer code") for scheduling at least one activity to achieve a time-varying energy balance of a power system. The method includes the following. A mission plan for a mission is received. The first mission plan includes at least one activity and at least one route. Each route of the at least one route includes at least one time and at least one location. A plurality of power load identifications for at least one time-varying power load for use in the first mission plan is received. A plurality of energy storage device identifications for at least one energy storage device is received. Optionally, a plurality of energy harvester identifications for at least one time-varying energy harvester for use in the first mission plan is received from the user via the GUI. A power requirement required to complete the first mission plan using the at least one power load is determined by an energy analysis code based on the plurality of power load identifications. An available energy for the mission is determined based on the first mission plan, the optional plurality of energy harvester identifications, and the plurality of energy storage device identifications. The at least one activity along the at least one route is scheduled based on the power requirement and the available energy.

An embodiment of the invention estimates the time-varying energy balance of a power system, where a power system is a collection of power loads, energy harvesters, and energy storage devices. The results are optionally used to:

(1) estimate the performance of a power system and guide changes to improve it;

(2) estimate the endurance of a power system and then extend it by changing how the power system is configured and/or used;

(3) assess the resources needed to operate the power system (e.g. how many energy storage devices); and/or (4) assess how much the use profile and/or environment influence the power system, and then plan accordingly.

An embodiment of the invention includes an energy analysis code that quantifies power system performance, thereby enabling engineers or field workers, for example, to make informed decisions. For example, a field worker can use the energy analysis code to estimate the length of time her/his equipment will operate, and then s/he can adjust the number of energy harvesters and energy storage devices until the desired mission endurance is achieved. Advantageously, this embodiment of the invention enables engineers to design field worker power systems that use power more intelligently for a given mission and environment. Advantageously, this embodiment of the invention enables field workers to plan and execute missions more intelligently. For example, before the mission starts, the energy analysis code according to this embodiment of the invention estimates the amount of energy required for a given mission so that the field worker need not carry excessive amounts of energy. Either a mission optimizer code, or optionally the user, then uses results from the energy analysis code to choose the best (e.g., the lightest) set of equipment to supply the energy required. As another example, the energy analysis code according to this embodiment of the invention, during the mission, generates updated estimates of the energy required and then uses the results to revise the mission plan.

An embodiment of the invention includes an energy analysis code that provides one or more of the following advantages. First, it resolves the problems inherent in traditional nominal-average analyses of power systems by estimating the power system energy balance at many small time steps to describe the behavior of devices more realistically. This is particularly important when incorporating time-varying environmental influences and/or field worker activities. Second, it includes validated non-linear device models to accurately capture the behavior of power loads, energy harvesters, and energy storage devices. Third, it uses straightforward models which can be compiled and run efficiently (in a reasonable amount of time) on a mobile device for use in the field. Fourth, missions often do not go as planned. The energy analysis code can be re-run on a mobile device at any time during a mission to evaluate how the present energy state of the system compares to the predicted energy state. The difference can guide revision of the mission plan.

An embodiment of the invention includes a database that provides (or databases that provide) one or more of the following advantages. First, it enables the invention to easily support a variety of other applications. Many applications can write mission parameters to the database and read the energy analysis results. Second, it facilitates use of environment parameters from a variety of sources. For example, the historical averages presently in the database could be replaced by real-time weather forecasts to achieve high-fidelity predictions responsive to the local environment. Also, the environmental parameters could be replaced by local sensor data read directly by the device running the energy analysis or indirectly through a network. Third, it decouples the energy analysis from the device parameters so the parameters can be updated and/or expanded independently without modifying the energy analysis.

An embodiment of the invention identifies the minimum weight combination of energy harvesters and energy storage devices that provide adequate energy for a planned mission. Another embodiment of the invention identifies the solar panel deployment times that minimize the total deployed time or minimize the solar panel size required.

Another embodiment of the invention guides a user' behavior when a mission unfolds differently than planned. For example, re-running the energy analysis on a mobile device during a mission with inputs that reflect the present power system state will yield an updated estimate for the energy required. Users (or a software application) can compare the original mission plan to the updated energy analysis to quantify the discrepancy. Users can then operate more conservatively if energy use has been greater than expected or schedule additional energy-intensive activities if energy use has been less than expected. Informing the user to "close the control loop" in this way enables them to use their energy more intelligently.

Another embodiment of the invention supports real-time controls in power systems with power managers capable of receiving and executing energy management commands. For example, an embodiment of the invention informs the decision-making of the power manager that puts connected power loads into an energy-saving state when the mission plan does not call for them to be used.

DETAILED DESCRIPTION OF THE INVENTION

Figure 1:
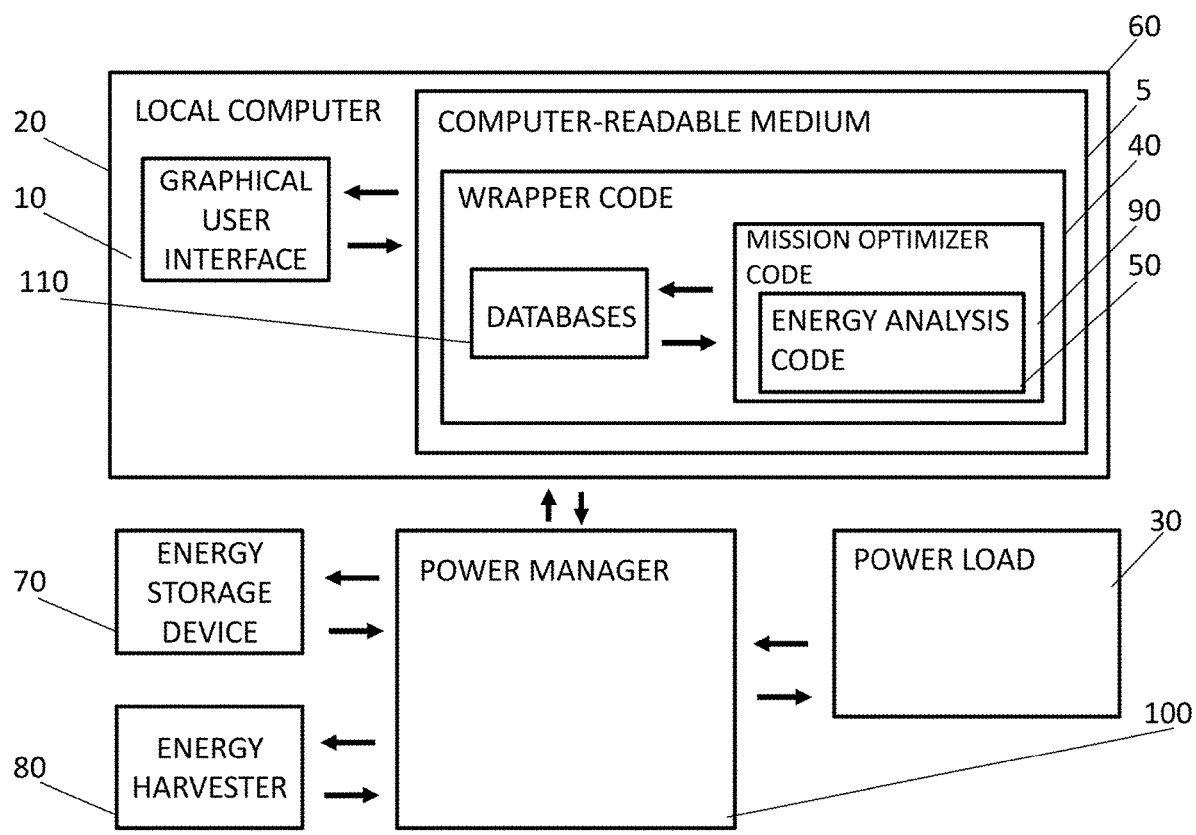
FIG. 1 is an illustrative block diagram of a system including an embodiment of the invention, all of the software portion of the embodiment of the invention being located in a local computer.
Figure 2:
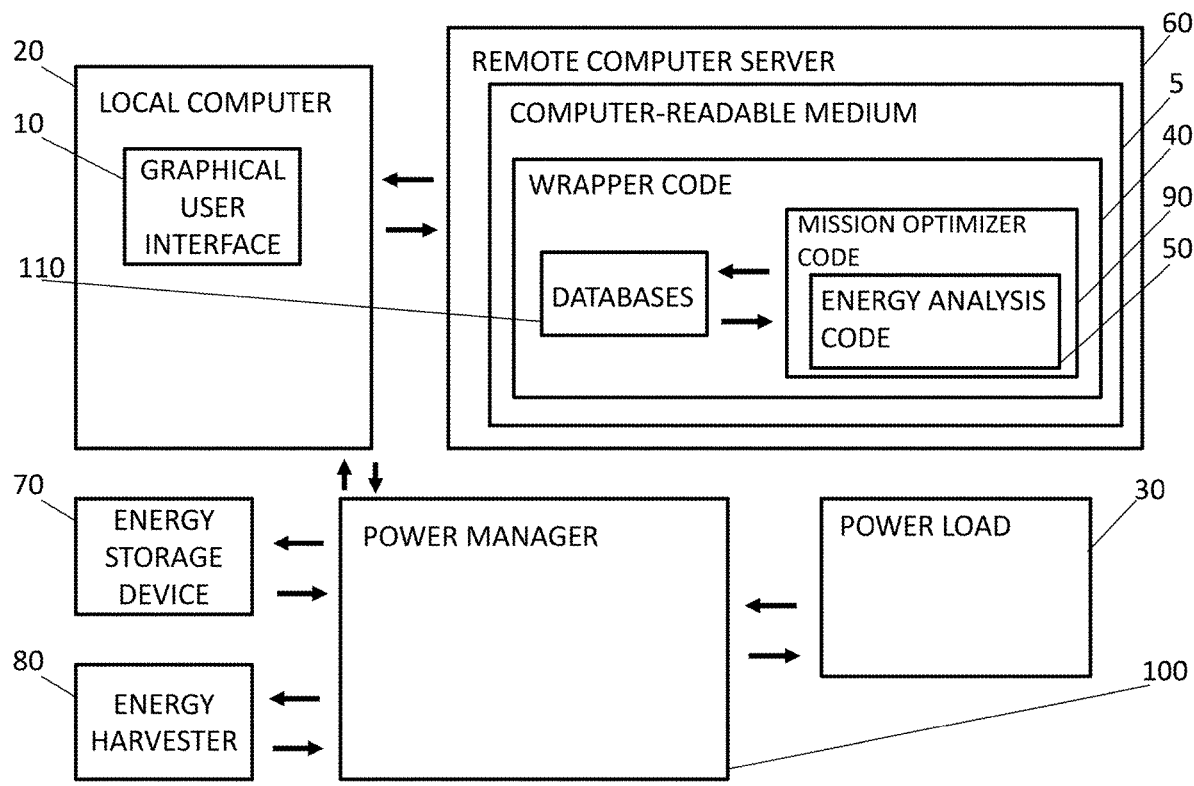
FIG. 2 is an illustrative block diagram of another system including an embodiment of the invention, the system including a local computer and remote computer communicating with the local computer, a GUI being located on the local computer and the balance of the software portion of the embodiment of the invention being located on the remote computer.

An embodiment of the invention includes a standard computer-readable medium 5 storing instructions that, when executed by at least one computer, cause the at least computer to carry out a method for estimating a time-varying energy balance of a power system. This embodiment is described below with reference to FIGS. 1 and 2. The method includes the following steps. A mission plan for a mission is received from a user via a graphical user interface ("GUI") 10 on a standard local computer 20, such as a standard desktop computer, a standard laptop computer, a standard mobile smartphone or a standard tablet computer. The local computer 20 is local to the user. The first mission plan includes at least one activity and at least one route. Each route of the at least one route includes at least one time and at least one location. Optionally, a plurality of power load identifications is received from the user via the GUI 10 for at least one standard time-varying power load 30 for use in the first mission plan. FIGS. 1 and 2 show only one power load for ease of understanding. However, one of ordinary skill in the art will readily appreciate that an embodiment of the invention includes a number of power loads, where the exact number depends on factors such as the activities of the mission, the available power for the mission, and the ability of the user to transport the power loads. A time-varying power requirement to complete the first mission plan is determined by a computer running a wrapper code program 40 including energy analysis code 50 using the at least one power load 30. In the illustrative system shown in FIG. 1, this computer is the local computer 20. In an alternative embodiment of the invention as shown in FIG. 2, this computer is a remote, standard computer 60, such as a remote, standard server, that communicates with the local computer 20.

A baseline plurality of standard energy storage devices required to satisfy the time-varying power requirement is determined by the energy analysis code 50. The baseline plurality of energy storage devices includes a baseline number and type of energy storage devices. Optionally, the energy storage devices include standard rechargeable energy storage devices and/or standard non-rechargeable energy storage devices. Examples of such energy storage devices include standard primary batteries, standard secondary batteries, standard capacitors, standard flywheels, and containers of standard chemical energy (e.g., a standard fuel) that can be converted to electrical energy by another standard device (e.g., a standard fuel cell or a standard combustion engine). FIGS. 1 and 2 show only one energy storage device for ease of understanding. However, one of ordinary skill in the art will readily appreciate that an embodiment of the invention includes more than one energy storage device, depending on power consumption needs and the ability of the user to transport the more than one energy storage device in combination with the one or more energy harvesters discussed below. The baseline plurality of energy storage devices includes a baseline stored energy. The baseline stored energy varies with load power and/or environmental conditions. One of ordinary skill in the art will readily appreciate that the amount of energy stored in the energy storage devices depends on how quickly it is withdrawn (e.g., the faster energy is withdrawn from a battery, the less energy a battery will provide) and the environment (e.g., the colder the environment, the less energy a battery will provide).

Optionally, the baseline plurality of energy storage devices includes a baseline weight. A plurality of energy harvester identifications for at least one time-varying energy harvester for use in the first mission plan is received via the GUI 10, the at least one energy harvester 80 comprising an energy harvester weight, an energy harvester volume, and/or a time-varying energy harvester power output. FIGS. 1 and 2 show only one energy harvester 80 for ease of understanding. However, one of ordinary skill in the art will readily appreciate that an embodiment of the invention includes more than one energy harvester, depending on power consumption needs and the ability of the user to transport the more than one energy harvester in combination with the one or more energy storage devices discussed above. The first mission plan is simulated iteratively over an equipment space by mission optimizer code 90 to generate an optimal equipment set. The equipment space includes a plurality of combinations of a universal plurality of energy storage devices and the at least one energy harvester. A universal plurality of energy storage devices and the at least one energy harvester is stored in a universal power source database stored locally on the local computer 20, as shown generally as databases 110 in FIG. 1. In alternative embodiment, the universal power source database is stored on the remote server 60, as shown generally as databases 110 in FIG. 2, wherein the remote server includes the wrapper code 40, the mission optimizer code 90, and the energy analysis code 50. For example, the universal power source database includes a universal energy storage device database and/or a universal energy harvester database. The databases store characteristics of each energy storage device and/or energy harvester such that a query can be formed to return energy storage device and/or energy harvester characteristics such as weight, indexed to the energy storage device and/or energy harvester identifications, for a subset of the energy storage device and/or energy harvesters. Such energy storage device characteristics include open circuit voltage, equivalent series resistance, charge capacity, minimum voltage, maximum voltage, weight, and/or volume. Open circuit voltage, equivalent series resistance, charge capacity, minimum voltage and maximum voltage may vary with temperature. Open circuit voltage and equivalent series resistance may also vary with state of charge. In an embodiment of the invention, energy storage device characteristics are indexed to different temperatures such that different values for open circuit voltage, equivalent series resistance, charge capacity, minimum voltage and/or maximum voltage for the same energy storage device are optionally stored in the universal energy storage device database. In an embodiment of the invention, energy storage device characteristics are also indexed to different states of charge such that different values for open circuit voltage and equivalent series resistance, for the same energy storage device are optionally stored in the universal energy storage device database. Energy harvester characteristics stored in the universal energy harvester database differ depending on the type of energy harvester. For a solar panel, for example, illustrative energy harvester characteristics include panel area, panel efficiency, and/or panel temperature coefficient. For a kinetic energy harvester, for example, illustrative energy harvester characteristics include power production indexed to walking speed, gait, and/or terrain grade. The optimal equipment set includes at least one minimum equipment set metric and an optimal energy storage device and energy harvester combination of the plurality of combinations of the universal plurality of energy storage devices and the at least one energy harvester.

Optionally, the at least one minimum equipment set metric comprises a minimum equipment set weight and/or a minimum equipment set volume.

Optionally, the simulating iteratively the first mission plan over an equipment space by an energy analysis code to generate an optimal equipment set by a mission optimizer code includes using a standard global optimizer. The global optimizer includes a standard evolutionary optimizer, a standard gradient descent optimizer, a standard deterministic optimizer, and/or a standard metaheuristic optimizer.

Optionally, the method further includes the following. A power load database of time-varying power loads including the plurality of power load identifications and a plurality of power consumption profiles is provided. Power consumption profiles correlate the power consumption of a load to the environment surrounding the load and the activity of the load user. For example, the power consumption of a two-way radio is often lower in standby mode and higher in transmit mode. As another example, the power consumption of a smartphone is greater in dark conditions because the display backlight is activated. As yet another example, the power consumption of a smartphone is often lower when stationary and higher when moving due to greater accelerometer activity. Each power load identification of the plurality of power load identifications corresponds to a respective environment-dependent and activity-dependent power consumption profile of the plurality of power consumption profiles. The simulating iteratively the first mission plan over an equipment space to generate an optimal equipment set includes accessing the power load database.

Optionally, an energy harvester database of time-varying energy harvesters includes the plurality of energy harvester identifications and a plurality of power production profiles. Each energy harvester identification of the plurality of energy harvester identifications corresponds to a respective environment-dependent and activity-dependent power production profile of the plurality of power production profiles. Power production profiles correlate the power production of an energy harvester to the environment surrounding the energy harvester and the activity of the energy harvester user. For example, the rate of power production by a solar panel depends on its environment; it produces more power in an environment with more solar irradiance and less power in an environment with higher ambient temperature. Furthermore, power production by a solar panel power depends on user activity; some activities prohibit deployment of a solar panel, making the harvested power zero during those activities, and other activities dictate a specific solar panel orientation with respect to the sun, influencing the effective solar irradiance. In the case of a kinetic harvester, the rate of power production can vary with user walking speed and terrain grade; walking faster or walking downhill produces more power. The simulating iteratively the first mission plan over an equipment space to generate an optimal equipment set includes accessing the energy harvester database.

Optionally, the optimal energy storage device and energy harvester combination of the plurality of combinations of the universal plurality of energy storage devices and the at least one energy harvester includes at least one optimal energy storage device and/or at least one optimal energy harvester. The method further includes the following. A standard power manager 100 is provided, the power manager communicating with the local computer 20. Illustrative power managers according to an embodiment of the invention include standard power managers built according to a standard Integrated Soldier Power and Data System ("ISPDS") specification, such as those manufactured by Physical Optics Corporation and Protonex Technology Corporation. The power manager 100 communicates with the at least one time-varying power load 30, the at least one optimal energy storage device 70 and/or the at least one optimal energy harvester 80.

Optionally, the method further includes the following. Expected usage of the at least one energy harvester and/or the at least one time-varying power load during the mission to complete the first mission plan is scheduled by the mission optimizer code 90 using the optimal energy storage device and energy harvester combination of the plurality of combinations of the universal plurality of energy storage devices and the at least one energy harvester or a suboptimal energy storage device and energy harvester combination of the plurality of combinations of the universal plurality of energy storage devices and the at least one energy harvester. Optionally, the method further includes the following. The power manager 100 is directed by the mission optimizer code 90 to power automatically the at least one time-varying power load 30 and/or draw power from the at least one energy harvester 80 based on the scheduled expected usage. Optionally, the method further includes the following. The mission optimizer code 90 directs the power manager 100 to switch automatically, or directs the user via a GUI instruction or request to switch manually, between the at least one of the at least one optimal energy storage device 70 and the at least one optimal energy harvester 80 based on the scheduled expected usage.

Optionally, the at least one optimal energy storage device includes a plurality of optimal energy storage devices. Optionally, not all of the energy storage devices are connected to the power manager at the same time. The method further includes the following. At least one energy storage device swap among the plurality of optimal energy storage devices is scheduled by the mission optimizer code 90 during the first mission plan and based on the scheduled expected usage. Optionally, the at least one activity includes at least one high priority activity and at least one low priority activity. The scheduling the at least one energy storage device swap includes scheduling the at least one energy storage device swap during a prior low priority activity of the at least one low priority activity relative to a later high priority activity of the at least one high priority activity.

Optionally, the power manager 100 outputs a presently available energy level including energy stored in the at least one optimal energy storage device and expected power to be produced by the at least one optimal energy harvester during a remainder of the mission. The method further includes the following. A mission plan completion percentage is determined by the mission optimizer code 90 during the mission by comparing the presently available energy level reported by the power manager 100 to the scheduled expected energy usage and energy harvesting. The user adjusts or changes the mission plan via the GUI 10. The mission optimizer code 90 receives the changed mission plan from the GUI 10, determines the mission completion percentage, and presents same to the user via the GUI 10. These steps involving the user interacting with the GUI 10 and the mission optimizer code 90 are iterated until the mission plan completion percentage is 100%. Optionally, the method further includes the following. The mission optimizer code 90 adjusts the mission plan iteratively until the mission plan completion percentage is 100% and presents the adjusted mission plan to the user via the GUI 10.

Optionally, the method further includes the following. The mission plan is changed by the user via the GUI 10, making any prior energy analysis obsolete. The determining during the mission a mission plan completion percentage and the adjusting at least one of the at least one power load and the at least one harvester and the at least one activity is repeated by the user until the mission plan completion percentage is maximized or 100%. One of ordinary skill in the art will readily appreciate that a maximized mission plan completion percentage may be greater than 100%, meaning that the user has excess energy supply available during the mission and may be carrying excess weight as a result. Optionally, the method further includes the following. The determining during the mission a mission plan completion percentage and the adjusting at least one of the at least one power load and the at least one harvester and the at least one activity is repeated by the mission optimizer code 90 until the mission plan completion percentage is 100%.

Optionally, at least one time-varying power load 30 includes a standard radio, a standard navigation unit, standard vision-enhancing goggles, a standard target-designation device, a standard camera, a standard wearable sensor, and/or a standard counter-improvised-explosive device equipment. The at least one energy harvester 80 includes a standard solar panel, a standard thermal energy harvester, a standard wind energy harvester, and a standard kinetic energy harvester. Examples of thermal energy harvesters according to an embodiment of the invention include standard thermoelectric generators, such as discussed in HYLAND et al., "Wearable thermoelectric generators for human body heat harvesting," Applied Energy, Volume 182, pp. 518-524, 15 Nov. 2016, Elsevier, Amsterdam, The Netherlands, incorporated herein by reference. Examples of wind energy harvesters according to an embodiment of the invention include Seaformatics Systems Inc.'s Waterlily turbine and Nils Ferber's Micro Wind Turbine. Examples of kinetic energy harvesters according to an embodiment of the invention include Bionic Power Inc.'s PowerWalk® knee brace and Perpetua Power Source Technologies, Inc.'s TEGwear textiles.

Another embodiment of the invention includes a standard computer-readable medium 5 storing instructions that, when executed by a computer, cause the computer to carry out a method for scheduling at least one activity to achieve a time-varying energy balance of a power system. The method includes the following. A mission plan for a mission is received from the user via the GUI 10 on the local computer 20. The mission plan includes at least one activity and at least one route. Each route of the at least one route includes at least one time and at least one location. A plurality of power load identifications for at least one time-varying power load 30 for use in the mission plan is received from the user via the GUI 10. A plurality of energy storage device identifications for at least one energy storage device 70 is received from the user via the GUI. Optionally, a plurality of energy harvester identifications for at least one time-varying energy harvester 80 for use in the mission plan is received from the user via the GUI. A power requirement required to complete the mission plan using the at least one power load is determined by energy analysis code 50 based on the plurality of power load identifications. An available power for the mission is determined using the energy analysis code 50 based on the mission plan, the optional plurality of energy harvester identifications, and the plurality of energy storage device identifications. The at least one activity along the at least one route is scheduled using the mission optimizer code 90 based on the power requirement and the available power.

Optionally, the method further includes the following. A power load database of time-varying power loads including the plurality of power load identifications and a plurality of power consumption profiles is provided in the local computer 20 as shown generally in FIG. 1 as databases 110. In an alternative embodiment, the power load database is provided in the remote server 60, as shown generally in FIG. 2 as databases 110. Each power load identification of the plurality of power load identifications corresponds to a respective environment-dependent and activity-dependent power consumption profile of the plurality of power consumption profiles. An energy storage device database including the plurality of energy storage device identifications for at least one energy storage device and a plurality of energy storage device profiles is provided in the local computer 20 as generally shown in FIG. I as databases 110. In an alternative embodiment, the energy storage device database is provided in the remote server 60, as shown generally in FIG. 2 as databases 110. Each energy storage device profile includes an open circuit voltage, an equivalent series resistance, a charge capacity, a minimum voltage, a maximum voltage, a weight, and/or a volume. The scheduling the at least one activity along the at least one route includes accessing the power load database and/or the energy storage device database.

Optionally, the method further includes the following. An energy harvester database of time-varying energy harvesters comprising the plurality of energy harvester identifications and a plurality of power production profiles is provided. Each energy harvester identification of the plurality of energy harvester identifications corresponds to a respective environment-dependent and activity-dependent energy production profile of the plurality of energy production profiles. The scheduling the at least one activity along the at least one route includes accessing the energy harvester database. For ease of illustration, databases 110 in FIGS. 1 and 2 include the universal power source database, which includes the energy storage device database and/or the energy harvester database, the power load database, an environmental conditions database and a mission plan activities database. In alternative embodiments of the invention, however, one or more of these databases 110 are distinct and separately accessed.

The environmental database includes environmental condition fields. Such environmental condition fields, for example, include measured air temperature, relative humidity, global horizontal solar irradiance, direct normal solar irradiance, and/or global normal solar irradiance, averaged over multiple years. Such environmental condition fields are, for example, indexed to location on the surface of the earth by latitude and longitude. Such environmental condition fields are, for example, indexed to day of the year and time of day. An alternative embodiment of the invention contains the same parameters, wherein the environmental condition fields are populated with weather forecast data, spanning the period of the planned mission. Such weather forecast data is, for example, stored in the environmental database by manually updating the database, or by automatically updating the database when new weather forecast data becomes available. The energy analysis code and mission optimization code are, for example, run again to modify the mission plan in light of the new weather forecast data to ensure the field worker has the most up-to-date plan for the anticipated environmental conditions of the mission.

The mission activities database includes activity fields. The activity fields are populated by activities that influence power consumption and/or production, including marching, hiking, running, climbing, ascending terrain, descending terrain, attacking, reconnaissance, surveillance, targeting, mission preparation, sleeping, resting, repairing, coordination with others, interactions with others, communicating with others, riding in a vehicle, patrolling, guard duty, forward observation, artillery direction, damage assessment, camping, eating, swimming, descending (underwater), ascending (underwater), pre-mission preparation, post-mission recovery, emergency maneuvers, energy gathering, and/or waiting. One of ordinary skill in the art will readily appreciate that, in an alternative embodiment of the invention, one or more of these databases 110 are distinct and separately accessed.

Optionally, the method further includes the following. A standard power manager 100 communicates with the at least one time-varying power load, the at least one energy storage device, and the at least one energy harvester is provided, the power manager communicating with the local computer 20. The scheduling the at least one activity along the at least one route includes scheduling the at least one activity using the power manager 100.

Figure 3:
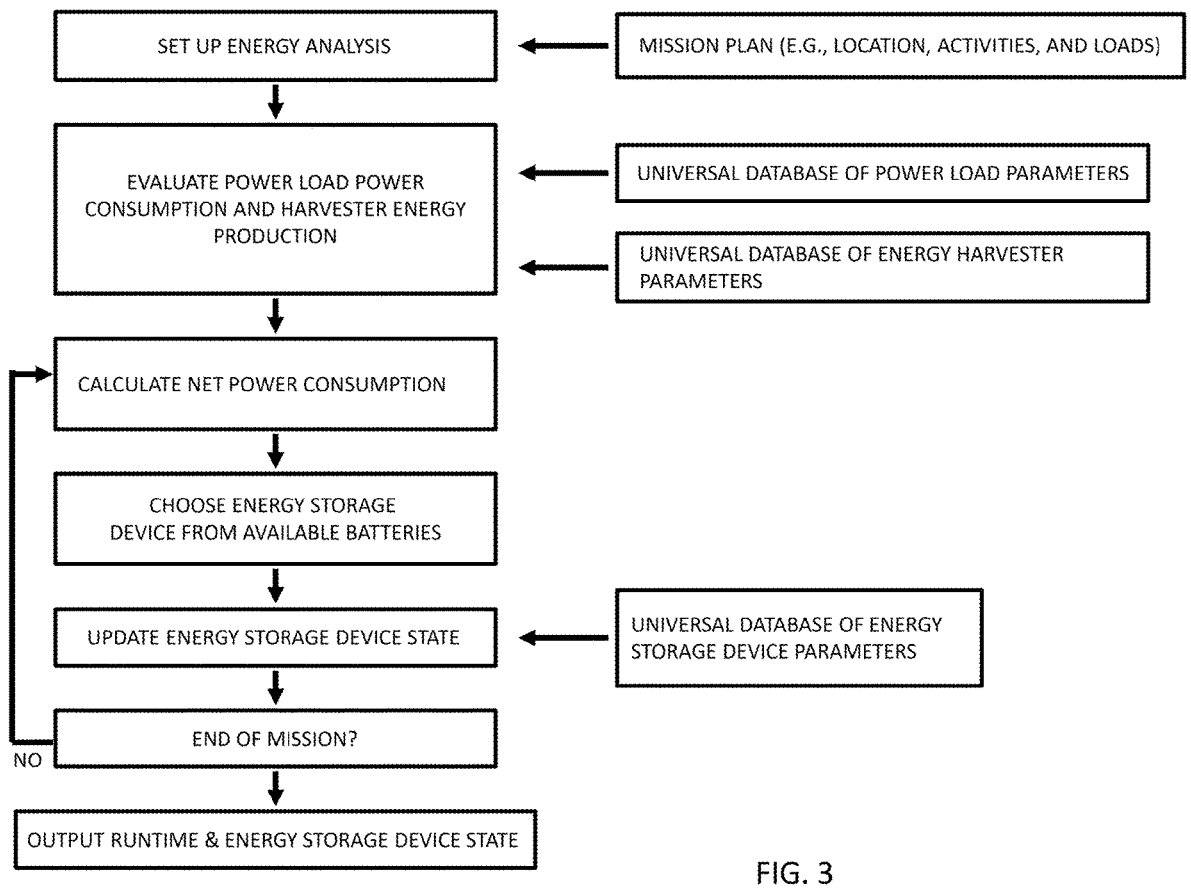
FIG. 3 is an illustrative flow chart of energy analysis software portion of the embodiment of the invention.

Another embodiment of the invention is described as follows with reference to FIGS. 1-3. The description of this embodiment of the invention includes an elaboration of the energy analysis code 50.

Method of Calculating the Energy Balance

Initially, the energy analysis code 50 sets up the analysis by breaking the mission into many small time steps, and identifies which activity occurs during each time step. The energy analysis code 50 then considers each time step sequentially. Starting with the first time step, the power produced by the energy harvester(s) and the power consumed by the load(s) are calculated. The difference between power produced and power consumed is calculated; it is the energy withdrawn from or stored in the energy storage device(s). The change in stored energy is used to update the energy storage device state for the next time step. If the energy storage device is depleted then it is swapped for another energy storage device. The time stepping and swapping processes continue until the mission is complete or the energy stored in all energy storage devices is exhausted.

Power Load, Energy Harvester, and Energy Storage Device Models

Databases 110 include parameters to inform models of power loads, energy harvesters and energy storage devices. Model parameters are obtained from measurements and/or manufacturers' specifications. The energy analysis code calculates the power consumed by each power load 30, produced by each energy harvester 80, and stored in each energy storage device 70 by calling an appropriate device model with parameters from the databases 110 at each time step in the mission.

Optionally, the databases 110 include parameters for more than one model of varying sophistication available for each device. In an embodiment of the invention, the energy analysis code 50 chooses the most sophisticated model that is feasible for each device given the parameters available in the database. Power loads have power consumption, which is fixed, varies with time, varies with field worker activity, and/or varies stochastically. Accordingly, the databases 110 include power consumption profiles for the power loads. Energy harvesters have power production, which is fixed, varies with solar flux, varies with temperature, varies with walking speed, and/or terrain grade. Accordingly, the databases 110 include power production profiles for the energy harvesters. Energy storage device energy content is fixed, varies with temperature, and/or varies with rate of charge or discharge. Accordingly, the databases 110 include energy storage device profiles for the energy storage devices, such as the battery model discussed below. At each time step, the energy balance of the power system is calculated by the energy analysis code 50 as the sum of power consumed by all power loads minus the power produced by all energy harvesters, as shown in Eq. (1).

$$P_{energystorage}(t_j) = \sum_{i=1}^{N_L} P_{load,i}(t_j) - \sum_{i=1}^{N_H} P_{harvester,i}(t_j)$$

In Eq. (1), $N_L$ is the total number of power loads. $N_H$ is the total number of energy harvesters, and $t_j$ is time step j where $t_0$ is the first time step in the mission and $t_{j,max}$ is the last time step in the mission. Parameters from the power load and energy harvester databases are used to inform the power load and energy harvester models to calculate the power load power consumption and energy harvester power production at each time step. Parameters from the energy storage device database are used to inform the energy storage device model and update the state(s) of energy storage device(s) in the power system at each time step. Energy and power calculations are carried out sequentially, one time step at a time, to ensure that the correct power system state is being used for each calculation, because the power system state depends on the results from prior time steps.

The device models incorporate nonlinear effects, such as the variation in battery efficiency (internal losses) due to $I^2R$ (ohmic) losses. By contrast, nonlinear effects such as these are omitted by traditional nominal-average estimation methods. For reference, see "Battery Management Systems: Equivalent-Circuit Methods" $2^{nd}$ Ed. Revised by Gregory L. Plett (2015), incorporated herein by reference.

The battery model uses Eq. (2) below to calculate battery terminal voltage as a function of battery power (from the energy balance as determined by the energy analysis code 50), open circuit voltage (from databases 110) and equivalent series resistance (from databases 110). The battery model uses Eq. (3) below to calculate battery current using the battery power and the calculated terminal voltage.

$$V_{Batt} = \frac{1}{2}\left(V_{OC} + \sqrt{V_{OC}^2 - 4P_{Batt}R_{ES}}\right) \quad (2)$$

$$i_{Batt} = \frac{V_{Batt}}{P_{Batt}} \quad (3)$$

The battery current is then integrated to determine the total amount of charge stored in the battery. The total amount of charge stored in the battery divided by the battery charge capacity is the battery state of charge. In an embodiment of the invention, a more sophisticated battery model includes open circuit voltage and equivalent series resistance measurements that vary with temperature and state of charge; standard interpolators are used to look up the correct values at each time step. Nearest, linear, and cubic spline interpolators have been implemented. In another embodiment of the invention, a less sophisticated battery model includes constant values of open circuit voltage and equivalent series resistance that approximate the battery. A combination of state of charge and terminal voltage are used to determine when a battery is fully charged or fully discharged.

Databases

Databases 110 store the parameters for the mission, the environment, and all power loads, energy storage devices, and/or energy harvesters that may be part of the power system. For each energy analysis, relevant input parameters are retrieved from the database and then the results are written to the database.

Different device classes often have different parameters; for example, a solar panel may have an efficiency and thermal coefficient, whereas a radio may have a transmit power consumption and a receive power consumption. Different devices within a class often have different parameter values; for example, two solar panels may have different efficiencies. Mission parameters include latitude, longitude, altitude, start time, and duration. An alternative embodiment of the invention include user (i.e., field worker) activity as a function of time. One of ordinary skill in the art will readily appreciate that the same activity may require more or less energy depending on the time of day and/or on duration.

Environmental parameters include, for example, solar flux, temperature, humidity, etc. The environmental parameters in an embodiment of the invention are multi-year averages compiled from data sources such as the National Renewable Energy Laboratory and the National Weather Service. The averages are indexed to location, date, and time. In an alternative embodiment, such averages are replaced by real-time weather forecasts.

The above-described energy analysis code 50 is, for example, coded in Simulink, in MATLAB, and/or in C++. A MATLAB version of the energy analysis code 50, for example, is used to auto-generate a C++ library, which can run on the local computer 20 to support an embodiment of the instant invention. In an alternative embodiment of the invention, a Simulink version of the energy analysis code 50 is used to generate a C++ library. The majority of modern programming languages have support for running compiled object libraries; so, translating from MATLAB/Simulink to C++ makes this embodiment of the invention applicable to multiple platforms and computing-environment/language agnostic. Using MATLAB or Simulink leverages the power of MATLAB and Simulink for analysis, the readability of Simulink block diagrams, and the speed and portability of C++ code. But, one of ordinary skill in the art will readily appreciate that alternative standard analysis and model-based design environments are advantageously used in other embodiments of the invention. For example, the energy analysis code is optionally coded in a variety of standard programming languages including, but not limited to, Python, Java, C, and Fortran.

In an embodiment of the invention, databases 110 include a SQLite database management system because it simplified integration of the embodiment of the instant invention in an Android environment. But, one of ordinary skill in the art will readily appreciate that alternative standard database management systems are advantageously used in other embodiments of the invention.

Figure 4:
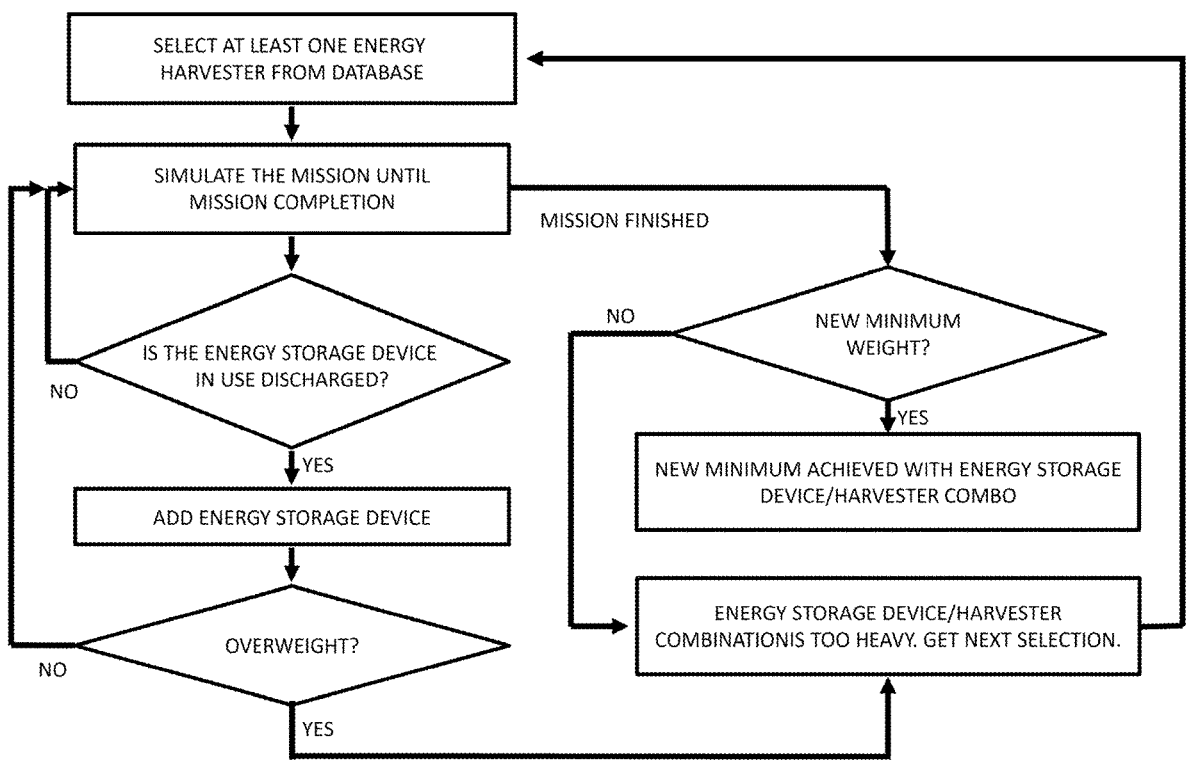
FIG. 4 is an illustrative flow chart of a mission optimizer software portion of the embodiment of the invention.

Another embodiment of the invention includes the mission optimizer code 90 and is described as follows with reference to FIGS. 1-2 and 4. The mission optimizer code 90 identifies the optimal combination of energy sources for a given load profile and environment. By optimal combination, an embodiment of the mission optimizer code 90 minimizes a mission plan metric, such as the total weight of energy sources. However, another embodiment of the mission optimizer code 90 advantageously optimizes other mission plan metrics, such as volume, number of devices, and/or fuel consumption.

Using total weight of energy sources as an illustrative mission plan metric, the mission optimizer code 90 runs the energy analysis code 50 multiple times to 1) evaluate the suitability of different combinations of energy sources; 2) discard infeasible combinations; and 3) retain the least weight combination. However, rather than a brute-force search of the entire design space, the mission optimizer code 90 first identifies the minimum number of standard energy storage devices the user, or field worker, must take to satisfy his or her energy needs. The weight of the minimum number of standard energy storage devices is $W_{max}$. The mission optimizer code 90 then considers each combination of energy storage devices and energy harvesters which weighs less $W_{max}$ and provides sufficient energy for the mission; from those combinations, it selects the one which weighs the least.

An embodiment of the mission optimizer code 90 includes the following method, using total weight of energy sources as an illustrative mission plan metric. In Step 1, select an energy harvester (or combination of harvesters) from the databases 110; it does not matter which one is first because they will all be evaluated eventually. In Step 2, run the energy analysis code 50 to simulate the mission. Add a new energy storage device each time one is exhausted. Continue until the mission is complete or the total weight W of harvester and energy storage devices exceeds $W_{max}$. In Step 3, if $W_{new} \geq W_{max}$, return to Step 1 and try the next energy harvester or combination of energy harvesters. In Step 4, if the mission is complete, and if $W_{new} < W_{max}$, then set $W_{max} = W_{new}$ and then return to Step 1 to try the next energy harvester or combination of energy harvesters. In Step 5, after all of the energy harvesters have been evaluated, $W_{max}$ is the minimum weight of energy sources that will satisfy the mission, and the corresponding equipment set is the optimal equipment set. If $W_{max}$ is unchanged, then the energy storage device-only equipment set is the lightest equipment set.

An embodiment of the mission optimizer code 90 includes two assumptions that can easily be changed, depending on the application. The first assumption is that the field worker can carry up to two energy harvesters, and the harvester which produces the most power for a given time step is the one connected to the power manager. It seems unlikely that a field worker would willingly carry more than two energy harvesters, and it seems reasonable to assume that he or she would use the most productive harvester in the set of energy harvesters at the field worker's disposal prior to the mission. The second assumption is that the mission optimizer code 90 always uses the energy storage devices with highest specific energy in the databases 110 for the baseline energy storage device-only equipment set. An embodiment of the invention does not evaluate heterogeneous combinations of energy storage devices.

However, another embodiment of the invention includes a mission optimizer extended to include heterogeneous combinations of energy storage devices. Advantageously, this embodiment of the invention addresses cases in which two energy storage devices with different capacities and weights enable a lower weight equipment set, because a small energy deficit at the end of the mission can be filled for less weight by the smaller energy storage device.

The mission optimizer code 90 according to an embodiment of the invention shifts the focus from analysis results to recommendations users can follow to minimize their burden. This is but one way that the mission optimizer code can guide mission planning, but is not the only way. One of ordinary skill in the art will readily appreciate that other optimizations are possible, depending on the application.

An embodiment of the invention comprises a computer program instructions, which computer program instructions embody the steps, functions, filters, and/or subsystems described herein relative to the wrapper code, the mission optimizer code, and/or the energy analysis code. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A non-transitory computer-readable medium storing instructions that, when executed by a computer, cause the computer to carry out a method for scheduling at least one activity to achieve a time-varying energy balance of a power system, the method comprising:
    receiving a mission plan for a mission, the mission plan comprising at least one activity and at least one route;
    receiving a plurality of power load identifications for at least one time-varying power load for use in the mission plan;
    receiving a plurality of energy storage device identifications for at least one energy storage device;
    receiving a plurality of energy harvester identifications for at least one time-varying energy harvester for use in the mission plan;
    determining based on the plurality of power load identifications a power requirement required to complete the mission plan using the at least one time-varying power load;
    simulating an available power for the mission;
    scheduling the at least one activity along the at least one route based on the power requirement and the available power; and
    using a power manager to perform at least one of:
        automatically powering the at least one time-varying power load and to draw power from the at least one time-varying energy harvester based on the scheduled at least one activity; and
        automatically switching between the at least one energy storage device and the at least one time-varying energy harvester based on the scheduled at least one activity,
    wherein said simulating an available power for the mission comprises simulating based at least in part on the mission plan, the plurality of energy harvester identifications, and the plurality of energy storage device identifications,
    wherein the method further comprises:
        providing a power load database of time-varying power loads comprising the plurality of power load identifications and a plurality of power consumption profiles, each power load identification of the plurality of power load identifications corresponding to a respective environment-dependent and activity-dependent power consumption profile of the plurality of power consumption profiles,
        providing an energy storage device database comprising the plurality of energy storage device identifications for at least one energy storage device and a plurality of energy storage device profiles, each energy storage device profile comprising at least one of an open circuit voltage, an equivalent series resistance, a charge capacity, a minimum voltage, a maximum voltage, a weight, and a volume,
    wherein said scheduling the at least one activity along the at least one route comprises accessing at least one of the power load database and the energy storage device database.

2. The non-transitory computer-readable medium according to claim 1, wherein the power manager communicates with the at least one time-varying power load, the at least one energy storage device, and the at least one time-varying energy harvester.

3. A non-transitory computer-readable medium storing instructions that, when executed by a computer, cause the computer to carry out a method for scheduling at least one activity to achieve a time-varying energy balance of a power system, the method comprising:
- receiving a mission plan for a mission, the mission plan comprising at least one activity and at least one route;
- receiving a plurality of power load identifications for at least one time-varying power load for use in the mission plan;
- receiving a plurality of energy storage device identifications for at least one energy storage device;
- receiving a plurality of energy harvester identifications for at least one time-varying energy harvester for use in the mission plan;
- determining based on the plurality of power load identifications a power requirement required to complete the mission plan using the at least one time-varying power load;
- simulating an available power for the mission;
- scheduling the at least one activity along the at least one route based on the power requirement and the available power; and
- using a power manager to perform at least one of:
  - automatically powering the at least one time-varying power load and to draw power from the at least one time-varying energy harvester based on the scheduled at least one activity; and
  - automatically switching between the at least one energy storage device and the at least one time-varying energy harvester based on the scheduled at least one activity,
- wherein said simulating an available power for the mission comprises simulating based at least in part on the mission plan, the plurality of energy harvester identifications, and the plurality of energy storage device identifications,
- wherein the method further comprises:
- providing an energy harvester database of time-varying energy harvesters comprising the plurality of energy harvester identifications and a plurality of power production profiles, each energy harvester identification of the plurality of energy harvester identifications corresponding to a respective environment-dependent and activity-dependent energy production profile of the plurality of energy production profiles,
- wherein said scheduling the at least one activity along the at least one route comprises accessing the energy harvester database.

4. The non-transitory computer-readable medium according to claim 3, wherein the power manager communicates with the at least one time-varying power load, the at least one energy storage device, and the at least one time-varying energy harvester.

* * * * *